United States Patent Office 3,359,306
Patented Dec. 19, 1967

3,359,306
HYDROXYNEOPENTYL ETHERS AND PROCESS FOR PREPARING THE SAME
Alford G. Farnham, Mendham, and Phillip E. Sonnet, Highland Park, N.J., assignors to Union Carbide Corporation, a corporation of New York
No Drawing. Filed Aug. 17, 1962, Ser. No. 217,538
9 Claims. (Cl. 260—521)

This invention relates to hydroxy ethers of aromatic hydroxy compounds, to starting materials therefor, to intermediates thereof, to products produced therefrom, and to methods for their preparation. More particularly, this invention relates to hydroxyneopentyl ethers of aromatic hydroxy compounds. These hydroxy ethers are especially suited for preparing polyesters and polycarbonates which are characterized by excellent thermal and hydrolytic stability.

The hydroxyneopentyl ethers of aromatic hydroxy compounds of the present invention have the formula:

Formula I

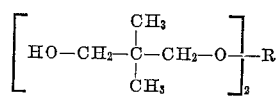

in which R is a divalent aromatic hydrocarbon radical, or the formula:

Formula II

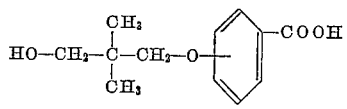

wherein the neopentyl ether group is in a position meta, para or ortho with respect to the —COOH group.

The term "divalent aromatic hydrocarbon radical" as used herein is intended to encompass both unsubstituted as well as substituted divalent aromatic hydrocarbon radicals. Illustrative of suitable radicals are arylene radicals such as phenylene and the like; aromatic hydrocarbon radicals such as naphthylene and the like; bis-(phenylene) alkane radicals such as 2,2-bis-(phenylene)propane, bis-(phenylene)methane, bis - (2,6 - dimethyl - 3 - methoxyphenylene)methane, 1,1-bis-(phenylene)ethane, 1,2-bis-(phenylene)ethane, 1,1 - bis - (3,5 - dimethylphenylene) ethane, 1,3-bis(3-methylphenylene)propane, 2,2-bis-(3-phenylphenylene)propane, 2,2-bis-(3-isopropylphenylene) propane, 2,2-bis-(2-isopropylphenylene)propane, 2,2-bis-(naphthylene)propane, 2,2-bis-(phenylene)pentane, 3,3-bis-(phenylene)pentane, 2,2-bis-(phenylene)heptane, bis-(phenylene)phenylmethane, bis - (phenylene)cyclohexyl-methane, 1,2-bis-(phenylene) - 1,2 - bis-(phenyl)propane, 2,2-bis-(phenylene)-1-phenylpropane and the like; biphenylene radicals such as 4,4'-biphenylene, 3,4'-biphenylene, and the like; bis-(phenylene)sulfone radicals such as bis-(p-phenylene)sulfone, bis-(o-phenylene)sulfone and the like; bis-(phenylene)ketone radicals such as bis-(p-phenylene)ketone, bis-(o-phenylene)ketone, and the like; diphenylene ether radicals such as the 4,3'-, 4,2'-, 2,2'-, 2,3'-diphenylene ethers, bis-(3-isobutylphenylene) ether, bis-(3-isopropylphenylene)ether, bis-(naphthylene) ether, bis-(biphenylene)ether, and the like.

Representative of hydroxyneopentyl ethers within the purview of Formula I wherein R is a divalent aromatic hydrocarbon radical are the following:

1,4-bis-(γ-hydroxy-β,β-dimethyl propoxy)benzene;
2,2-bis-[4-(γ-hydroxy-β,β-dimethyl propoxy)phenyl] propane;
bis-[4-(γ-hydroxy-β,β-dimethyl propoxy)phenyl] methane;
2,4'-bis-(γ-hydroxy-β,β-dimethyl propoxy)diphenyl methane;
1,1-bis-[4-(γ-hydroxy-β,β-dimethyl propoxy)phenyl] ethane;
2,2-bis-[4-(γ-hydroxy-β,β-dimethyl propoxy)phenyl] heptane;
4,3'-bis-(γ-hydroxy-β,β-dimethyl propoxy)biphenyl;
bis-[4-(γ-hydroxy-β,β-dimethyl propoxy)phenyl] sulfone;
4,4'-bis-(γ-hydroxy-β,β-dimethyl propoxy) benzophenone; and
4,4'-bis-(γ-hydroxy-β,β-dimethyl propoxy)diphenyl ether.

Particularly desirable compounds of the present invention are those wherein R is a divalent aromatic hydrocarbon radical as previously described having a maximum of 15 carbon atoms and being free of interfering groups, that is, the halogens (F, Cl, Br, and I).

Preferred hydroxyneopentyl ethers of the present invention are those falling within the scope of Formula I wherein R is a divalent phenylene radical as illustrated by compounds having the formula:

Formula III

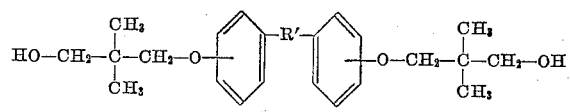

wherein the neopentyl ether groups are para, ortho or meta with respect to R', and wherein R' is a divalent acyclic radical generally having 1 to 10 carbon atoms inclusive and preferably having 1 to 3 carbon atoms inclusive. Exemplary of such radicals are alkylene radicals such as methylene, ethylene, trimethylene, tetramethylene, pentamethylene, hexamethylene, 2-ethylhexamethylene, octamethylene, nonamethylene, decamethylene, and the like; and alkylidene radicals such as ethylidene, propylidene, isopropylidene, isobutylidene, amylidene, isoamylidene, 1-phenylethylidene and the like.

The hydroxyneopentyl ethers of the present invention falling within the purview of Formula I can be prepared from an aromatic dihydroxy compound having the general formula:

R(OH)₂ wherein R is a divalent aromatic hydrocarbon radical as previously defined, and neopentylene sulfate, more properly known as 5,5-dimethyl-1,3,2-dioxthiane-2,2-dioxide, having the formula:

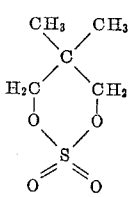

Aromatic hydroxy compounds used for preparing compounds falling within the purview of Formula II are meta-hydroxybenzoic acid, para-hydroxybenzoic acid, ortho-hydroxybenzoic acid, these being used with neopentylene sulfate to produce Formula II compounds.

Aromatic dihydroxy compounds used for preparing preferred compounds falling within the purview of Formula III have the formula:

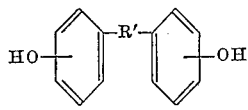

wherein the —OH groups are in a position para, ortho or meta with respect to R' and wherein R' is a divalent acyclic radical as previously defined.

The preparation of neopentylene sulfate is accomplished by reacting neopentylene glycol with thionyl chloride to obtain cyclic neopentylene sulfite, which is then subsequently oxidized to cyclic neopentylene sulfate. The overall reaction can be represented by the following equation designated as Reaction A:

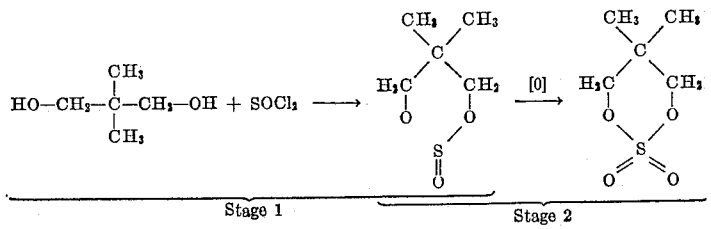

Stage 1     Stage 2

Various amounts of the starting materials for the first stage of Reaction A can be used. Generally about 90% of stoichiometric to about 50% in excess of stoichiometric of thionyl chloride is employed, and preferably about stoichiometric to about 10% in excess of stoichiometric of thionyl chloride is employed. More than about 50% in excess of stoichiometric of thionyl chloride can be used, but this is economically undesirable.

For purposes of stoichiometric calculations, one sulfinyl group:

is deemed to react with one molecule of neopentylene glycol:

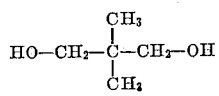

The temperature at which the first stage of Reaction A is conducted can be varied over a wide range, from as low as about 0° C. to a temperature just below the decomposition temperature of the reactants and of the neopentylene sulfite. At temperatures lower than about 20° C., the reaction proceeds slowly. A temperature in the range of about 35° C. to about 40° C. is preferred.

If desired, the first stage of Reaction A can be carried out in the presence of an aromatic hydrocarbon diluent which is nonreactive with respect to the starting materials and the final product, and which is a medium for the reaction. Suitable aromatic hydrocarbon diluents are benzene, toluene, and the like. The aromatic hydrocarbon diluent is used in amounts up to about 30% by weight based on the weight of the starting materials.

Recovery of the product obtained from the first stage of Reaction A can be conveniently accomplished by fractionation.

The oxidation of cyclic neopentylene sulfite in the second stage of Reaction A is generally accomplished by admixing the sulfite with a suitable oxidizing agent at a temperature of about 0° C. to about 25° C. and preferably about 10° C. to about 15° C. As a practical matter, the oxidizing agent is used in amounts sufficient to oxidize all of the neopentylene sulfite present to neopentylene sulfate. However, about 90% of the stoichiometric amount of oxidizing agent to about 50% in excess of stoichiometric can be used. It is preferred to use an excess of stoichiometric to insure completeness of the reaction.

Illustrative of suitable oxidizing agents are permanganates, and the like. Preferred oxidizing agents are permanganates having the formula:

$$MeMnO_4$$

wherein Me is an alkali metal such as sodium, potassium or lithium; or an alkaline earth metal such as calcium, strontium and barium. The preferred permanganate is calcium permanganate.

In conducting the oxidation reaction of Reaction A, it is preferred to admix the reactants in a dilute aqueous acid medium having a pH of from about 1 to about 2. Exemplary of such acids are acetic acid, and the like, with acetic acid being preferred.

Recovery of the neopentylene sulfate from the second stage of Reaction A can be conveniently accomplished by fractionation.

Both stages of Reaction A are generally conducted under atmospheric pressures, although if desired, the reaction can be conducted under subatmospheric or superatmospheric pressures. These stages can also be conducted in the presence of an inert atmosphere such as nitrogen.

The preparation of the hydroxyneopentyl ethers of the present invention is generally accomplished by first admixing an aromatic hydroxy compound with an alkali metal hydroxide to form the hydrated alkali metal salt of the aromatic hydroxy compound. This alkali metal salt is then reacted with neopentylene sulfate, described previously, to form an alkali metal sulfate intermediate compound which is acid hydrolyzed to form the corresponding hydroxy-neopentyl ether. If desired, the reaction can also be conducted by first admixing an aromatic hydroxy compound with neopentylene sulfate and then adding the alkali metal hydroxide, or simultaneously admixing all three starting materials.

By way of illustration, not by limitation, and for purposes of discussion, the preparation of a hydroxyneopentyl ether falling within the purview of Formula III is accomplished according to the present invention by the reaction of a mixture containing sodium hydroxide, 2,2-bis(p-hydroxyphenyl)propane and neopentylene sulfate. Acid hydrolysis with dilute hydrochloric acid of the sodium sulfate intermediate formed results in the formation of the desired hydroxyneopentyl ether. The overall reaction can be represented by the following equation designated as Reaction B. It is to be understood that the discussion which follows Reaction B with respect to stoichiometric amounts, reaction temperatures, and reaction conditions is equally applicable to the preparation of compounds falling within the purview of Formulas I and II.

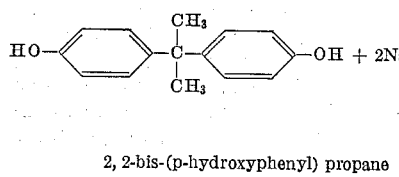

2,2-bis-(p-hydroxyphenyl) propane

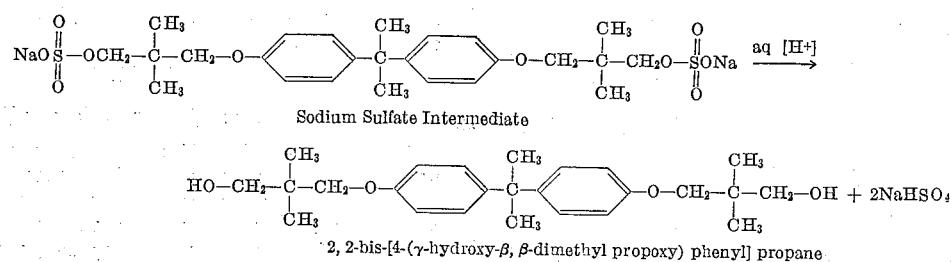

Neopentylene Sulfate

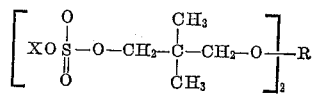

Sodium Sulfate Intermediate

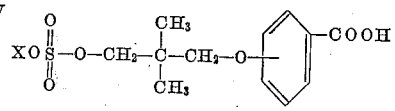

2,2-bis-[4-(γ-hydroxy-β,β-dimethyl propoxy) phenyl] propane

} Reaction B

Various amounts of aromatic hydroxy compound, alkali metal hydroxide an neopentylene sulfate can be employed as starting materials. Generally, about 90% of stoichiometric to about 10% in excess of stoichiometric of neopentylene sulfate is employed, preferably about stoichiometric to about 5% in excess of stoichiometric of neopentylene sulfate is employed. More than about 10% in excess of stoichiometric can be used, but this is economically unfeasible. For purposes of stoichiometric calculations, one aromatic hydroxy group:

is deemed to react with one molecule of neopentylene sulfate:

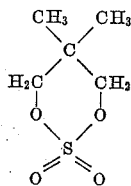

Generally, about 90% of stoichiometric to about 5% in excess of stoichiometric of alkali metal hydroxide is employed, and preferably about stoichiometric to about 2% in excess of stoichiometric of alkali metal hydroxide is employed. More than about 5% in excess of stoichiometric can be used, but this is economically unfeasible. For purposes of stoichiometric calculations, one aromatic hydroxy group is deemed to react with one molecule of alkali metal hydroxide.

The temperature at which Reaction B is conducted can be varied over a wide range, from as low as about 50° C. to a temperature just below the decomposition temperature of the reactants and of the hydroxyneopentyl ether formed. At temperatures lower than about 50° C., the reaction proceeds sluggishly. A temperature in the range of about 80° C. to about 130° C. is most preferred.

The intermediate of Reaction B is hydrolyzed to the corresponding hydroxyneopentyl ether by aqueous solutions of mineral acids such as hydrochloric acid, sulfuric acid, phosphoric acid, and the like. The preferred acid is hydrochloric acid.

Reaction B can be carried out in the presence of a suitable diluent which is a solvent for the neopentylene sulfate and a medium for the reaction, and which is non-reactive with respect to the starting materials, the intermediate and the final product. Illustrative of suitable diluents are a mixture of water and 1,4-dioxane, dimethyl sulfoxide, isopropyl alcohol, and the like. For purposes of the present invention, the diluent is used in amounts up to about 200 percent based on the weight of the starting materials. The preferred diluent is a mixture of water and 1,4-dioxane in a ratio of one to one.

Reaction B is generally conducted under atmospheric pressures, although if desired, the reaction can be conducted under subatmospheric or superatmospheric pressures. The reaction can also be conducted in the presence of an inert atmosphere such as nitrogen for example.

Recovery and purification of the end product and intermediate obtained from Reaction B can generally be accomplished by filtration and recrystallization from suitable solvents such as toluene.

The intermediate compounds of the present invention have the formula:

Formula IV $$\left[ XO\overset{O}{\underset{O}{S}}-O-CH_2-\overset{CH_3}{\underset{CH_3}{C}}-CH_2-O-\right]_2 R$$

wherein X is an alkali metal and R is a divalent aromatic hydrocarbon radical as previously described with respect to Formula I, or the formula:

Formula V

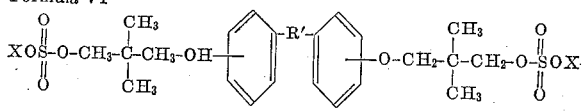

wherein X is an alkali metal, and the preferred intermediates have the formula:

Formula VI

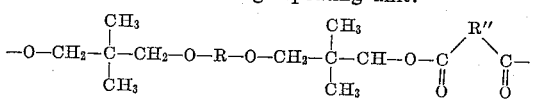

wherein X is an alkali metal and R' is a divalent acyclic radical as previously defined, and wherein the substituents on each ring are in a position as previously defined.

Polyesters can be prepared from the hydroxypentyl ethers falling within the purview of Formulas I and III which contain the following repeating unit:

$$-O-CH_2-\overset{CH_3}{\underset{CH_3}{C}}-CH_2-O-R-O-CH_2-\overset{CH_3}{\underset{CH_3}{C}}-CH-O-\overset{O}{\underset{}{C}}\overset{R''}{\diagup}\overset{}{\underset{O}{C}}-$$

wherein R is a divalent aromatic hydrocarbon radical as previously defined, and wherein R'' is a divalent hydrocarbon radical as will be subsequently defined with respect to the dibasic acids used to form the polyesters.

The polyesters can be prepared by esterifying hydroxyneopentyl ethers falling within the purview of Formulas I and III with a dibasic acid or esters of the same. By the term "dibasic acid" is meant an aromatic or acylic dicarboxylic acid containing two —COOH groups and includes saturated as well as unsaturated dibasic acids.

By the term "esters" is meant that one or both —COOH groups of a dibasic acid have been esterified with an acyclic or aromatic monohydric alcohol containing from 1 to 18 carbon atoms.

Suitable dibasic acids have the formula:

$$HOOC-R''-COOH$$

wherein R'' is a divalent hydrocarbon radical which can be saturated as well as unsaturated. When R'' is a saturated radical, the dibasic acids have the formula:

$$HOOC-(CH_2)_x-COOH$$

wherein $x$ is an integer having a value of from 0 to 20 inclusive, exemplary of which are oxalic, malonic, succinic, glutaric, adipic, sebacic, pimelic, suberic, azelaic, sebouic, brassylic, roccellic, alkyl succinic, cetyl malonic, and the like. When R'' is an unsaturated radical, the dibasic acids have the formula:

$$HOOC-(C_zH_{2z-2})-COOH$$

wherein $z$ is an integer having a value of from 2 to 20 inclusive, exemplary of which are fumaric, maleic, glutaconic, citraconic, itaconic, ethidenemalonic, mesaconic, allylmalonic, propylidenemalonic, hydromuconic, pyrocinchonic, carbocaprolactonic, teraconic, xerenic, and the like. Also suitable are aromatic dibasic acids such as phthalic, isophthalic, substituted phthalic, uvitic, xylidinic, cumidinic, and the like. Illustrative of suitable esters of these dibasic acids include, among others, mono methyl succinate, mono ethyl adipate, mono isobutyl maleate, mono ethyl isophthalate, diphenyl isophthalate, and dimethyl isophthalate.

The polyesters of the hydroxyneopentyl ethers falling within the purview of Formulas I and III can be prepared by the procedure detailed in U.S. Patents 2,496,-933, 2,595,343 and 2,634,251, which are incorporated herein by reference. A series of these polyesters were prepared and the results are contained in Examples 8 through 11 of this application.

Polyesters of the hydroxyneopentyl ethers falling within the purview of Formula II can be prepared containing the following repeating unit:

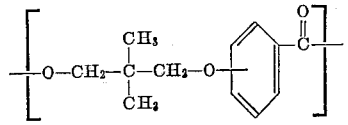

wherein the neopentyl ether group is in a position meta, para or ortho with respect to the

group. These polyesters are formed by a self-esterification process whereby the —OH group of one molecule of a Formula II compound condenses with the —COOH group of a second molecule of a Formula II compound. The process by which these polyesters can be prepared is detailed in U.S. Patent 2,600,376, which is incorporated herein by reference.

Polycarbonates can be prepared from the hydroxyneopentyl ethers falling within the purview of Formulas I and III which contain the following repeating unit:

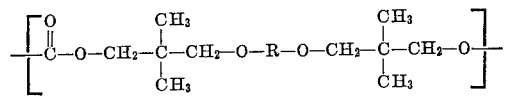

wherein R is a divalent aromatic hydrocarbon radical as previously defined. These polycarbonates can be prepared by reacting Formula I and III hydroxyneopentoxy ethers with an organic carbonate such as diphenyl carbonate and the like according to the process detailed in Example 12 of this application. These polycarbonates can also be prepared by reacting Formula I and III hydroxyneopentyl ethers with phosgene in the presence of an alkali metal hydroxide according to the process detailed in U.S. Patent 2,970,131, which is incorporated herein by reference.

The polycarbonates and polyesters prepared from the hydroxyneopentyl ethers of the present invention can be molded into varied useful products such as buttons, electrical insulators, electrical fuse and switch boxes, lamp shades and the like, and may be cast into self-sustaining films which may be subsequently used for packaging and the like.

The following examples further illustrate the present invention and are not intended to limit the scope thereof in any manner.

EXAMPLE 1

Preparation of neopentylene sulfate

*First stage.*—A dry 500 ml. round bottom, three-neck flask was equipped with a paddle stirrer, thermometer and Y-neck. A dropping funnel was inserted into one side of the Y-neck and the other side was made to serve as a vent for gas evolved during the reaction. Eighty-eight grams (0.68 mole) of neopentylene glycol in 100 cc. of benzene was charged into the flask and stirred while 50.8 ml. (0.68 mole) of thionyl chloride was added dropwise over a period of about one hour. A reaction temperature of 35–40° C. was established and maintained during the thionyl chloride addition, after which the reaction mixture was heated to 70° C. and maintained at this temperature for 15 minutes to drive off residual hydrogen chloride. The neopentylene sulfite product was then separated from the reaction mixture by fractional distillation through an 18-inch Vigreux column. The product in the form of a liquid was purified by a second fractional distillation. The product was obtained in a yield of 93 percent and was found to have a $n_D^{25}$ of 1.4450. This yield was greater than that previously reported by Markees et al., J.A.C.S., 71, 2031 (1949) (yield 70%, $n_D^{25}$ 1.4465) and Szmant et al., J.A.C.S., 78, 454 (1956) (yield 70%, $n_D^{25}$ 1.4450).

*Second stage.*—A mixture of 100 cc. water, 50 cc. acetic acid, and 86.1 grams (0.234 mole) of calcium permanganate was charged into a 500 ml. three-neck flask equipped with the same apparatus as described in the first stage. The mixture was stirred while a solution of 25.6 ml. (0.2 mole) of neopentylene sulfite from the first stage in 50 cc. of acetic acid was added dropwise over a period of six hours. An ice bath was used to maintain a reaction temperature of 10–15° C. After the addition of the sulfite, the reaction mixture was poured into a 1 liter beaker containing 100 grams of cracked ice and 96 grams of sodium carbonate ($Na_2CO_3$) which had been previously ground together to prevent caking. After the acetic acid had been neutralized, sodium hydrogen sulfite ($NaHSO_3$) was added to remove excess permanganate, indicated by the absence of the permanganate color. The neopentylene sulfate product was then extracted from the reaction mixture with six 100 ml. portions of ethyl ether, and the solution was concentrated on a steam bath, filtered and evaporated. The neopentylene sulfate product was recrystallized from ethanol as colorless needles or leaves having a melting point of 78.5 to 80.5° C. The yield was 66 percent.

EXAMPLE 2

Preparation of 2,2-bis-[4-(γ-hydroxy-β,β-dimethyl propoxy)phenyl]propane

A 500 ml., three-neck flask equipped with a paddle stirrer, thermometer, and reflux condenser, was charged with a 50 cc. of water. Eighteen and seven tenths grams (0.082 mole) of 2,2-bis-(p-hydroxyphenyl)propane was stirred into the water under an atmosphere of nitrogen. The hydrated sodium salt of this compound was formed by adding 6.56 grams (0.164 mole) of sodium hydroxide to the mixture. The temperature was then raised to 80° C.; 50 cc. of peroxide-free dioxane and 28.5 grams (0.17 mole) of neopentylene sulfate from Example 1 were then added. The entire reaction mixture was stirred at 100° C. reflux for twenty hours, at which time the mixture was cooled to 5° C., digested with 10 ml. dilute HCl for 2 hours, and the resulting product filtered out. The product was washed with water, dissolved in boiling toluene, filtered hot and crystallized by chilling. Recrystallization from toluene resulted in an end product of colorless needles having a melting point of 199–200° C. The yield was 72.9 percent and the overall yield from neopentylene glycol was 45 percent.

EXAMPLE 3

*Preparation of 4,4'-bis-(γ-hydroxy-β,β-dimethyl propoxy)benzophenone*

This hydroxyneopentyl ether was prepared employing the procedure detailed in Example 2, using 0.172 mole of neopentylene sulfate, 0.082 mole of benzophenone (M.P., 216–217° C.) and 0.164 mole NaOH. The reaction mixture was refluxed for 22 hours, digested with 10 ml. dilute HCl for 2 hours and chilled. The product formed was recrystallized from toluene, and found to have a melting point of 140–141° C. The yield from benzophenone was 39.6 percent. Infrared analysis of this product showed a strong absorption at 7.9μ, which is consistent with the ether linkage.

EXAMPLE 4

*Preparation of bis-[4-(γ-hydroxy-β,β-dimethyl propoxy)phenyl]methane*

This hydroxyneopentyl ether was prepared employing the procedure detailed in Example 2, using 0.164 mole of neopentylene sulfate, 0.082 mole of bis-(4-hydroxyphenyl)methane (M.P., 160–162° C.) and 0.164 mole NaOH. The crystalline product obtained had a melting point of 133–134° C., and the yield from bis-(4-hydroxyphenyl)methane was 38.7 percent. Infrared analysis of this product showed a strong absorption at 8.0μ, which is consistent with the ether linkage.

EXAMPLE 5

*Preparation of 4,4'-bis-(γ-hydroxy-β,β-dimethyl propoxy)diphenyl*

This hydroxyneopentyl ether was prepared employing the procedure detailed in Example 2, using 0.172 mole of neopentylene sulfate, 0.082 mole of 4,4'-dihydroxy diphenyl (M.P. 274–275° C.) and 0.164 mole NaOH. The crystalline product that was obtained had a melting point of 169.5–171° C., and the yield from 4,4'-dihydroxy diphenyl was 20.3 percent.

EXAMPLE 6

*Preparation of 2,4'-bis-(γ-hydroxy-β,β-dimethyl propoxy)diphenyl methane*

This hydroxyneopentyl ether was prepared employing the procedure detailed in Example 2, using 0.164 mole of neopentylene sulfate, 0.082 mole of 2,4'-di(hydroxyphenyl)methane (M.P., 116–120° C.) and 0.164 mole NaOH. The product obtained was a colorless oil at room temperature. Infrared analysis of this product showed a strong absorption at 8.1μ, which is consistent with the ether linkage.

EXAMPLE 7

*Preparation of 4-(γ-hydroxy-β,β-dimethyl)propoxy benzoic acid*

This hydroxyneopentyl ether was prepared employing the procedure detailed in Example 2, using 0.082 mole of neopentylene sulfate, 0.082 mole of p-hydroxybenzoic acid (M.P., 213° C.) and 0.164 mole NaOH. The crystalline product obtained had a melting point of 166–168° C., and the yield from p-hydroxybenzoic acid was 39.3 percent. Infrared analysis of this product showed strong absorption of 5.9μ and 7.9μ, consistent with the carbonyl group and the ether linkage respectively.

EXAMPLE 8

*Polyester preparation*

A 50 ml. distillation flask was charged with 10.01 grams (0.025 mole) of 2,2-bis-[4-(γ-hydroxy-β,β-dimethyl propoxy)phenyl]propane from Example 2, and 3.65 grams (0.025 mole) of adipic acid under an atmosphere of nitrogen. The reaction mixture was heated in an oil bath to 185° C. and kept at that temperature for 3 hours, after which time the flask was purged with nitrogen, and evacuated to 4 mm. Hg. The flask and its contents were heated to 270° C. and remained overnight at that temperature. The reaction mixture was then cooled, dissolved in chloroform, filtered, precipitated in ethanol, filtered again, washed, dried, and was subsequently cast from a chloroform solution into a rubbery film. The yield was 7.55 grams (59.2%) and the polyester had a reduced viscosity in chloroform of 0.54, and a melting point of 114–165° C. The polyester contained the following repeating unit:

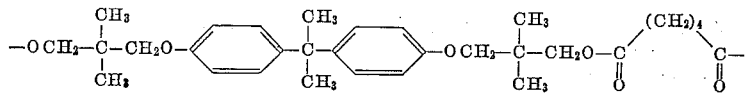

Other polyesters were prepared from the condensation of 2,2-bis-[4-(γ-hydroxy-β,β-dimethyl propoxy) phenyl]propane and a dibasic acid, using the procedure detailed in Example 8. The results of these examples are summarized in the table:

| Example | Acid | Catalyst | Reduced Viscosity in CHCl₃ | M.P., °C. |
|---|---|---|---|---|
| 9 | Succinic | None | 0.41 | 115–150 |
| 10 | Sebacic | do | 1.00 | |
| 11 | Isophthalic | Zn(Ac)₂Sb₂O₃ | 0.15 | 116–140 |

EXAMPLE 9

*Polycarbonate preparation*

A 100 ml. side arm flask was charged with 10.01 grams (0.025 mole) of 2,2-bis-[4-(γ-hydroxy-β,β-dimethyl propoxy)phenyl]propane from Example 2, and 6.4 grams (0.025 mole plus 20% excess) diphenyl carbonate. The reactants were heated to 190° C. at which point phenol distilled off slowly. A small amount of LiOH was added whereupon the reaction proceeded more readily. The temperature was maintained at 190–220° C. for 3 hours at which time very little or no phenol was distilling off. Over a two hour period, the temperature of the flask and contents was raised to 280° C. and over the same period the pressure in the flask was reduced to 5 mm. Hg. The reaction flask was then allowed to remain overnight at this temperature and pressure, after which the reaction mixture was cooled, dissolved in chloroform, filtered, precipitated in ethanol, filtered again, washed and finally dried. The polycarbonate product obtained in a 70% yield (8.5 grams) had a reduced viscosity in chloroform of 0.48, and X-ray diffraction analysis showed some degree of crystallinity. The product was found to soften at 182° C. and melt at 185–190° C., both as determined by capillary melting point using a crystallized powder form of the product.

A hot-stage polarizing microscope was used to observe a melting point of 172° C. exhibited by a cast film form of the product. The polycarbonate prepared according to this example had the following repeating unit:

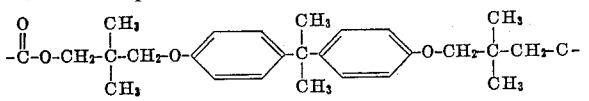

Reduced viscosity measurements made with respect to the thermoplastic polyesters and polycarbonates of this invention were 25° C.

What is claimed is:

1. A hydroxyneopentyl ether having the formula:

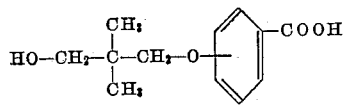

2. 4,4'-bis-(γ-hydroxy-β,β-dimethyl propoxy)biphenyl having the formula:

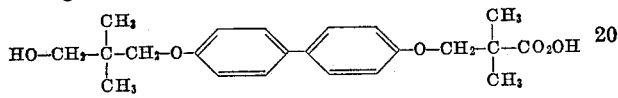

3. 4-(γ-hydroxy-β,β-dimethyl)propoxy benzoic acid having the formula:

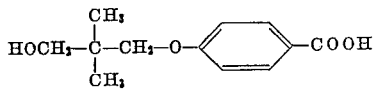

4. Process for preparing hydroxyheopentyl ethers which comprises admixing an aromatic hydroxy compound selected from the group consisting of compounds having the formula:

$$R(OH)_2$$

wherein R is a divalent radical selected from the group consisting of arylene, bis-(phenylene) alkane, biphenylene, bis-(phenylene) sulfone, bis-(phenylene)ketone, and diphenylene ether radicals, and compounds having the formula:

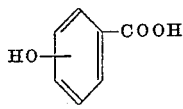

with at least about 90% of stoichiometric of an alkali metal hydroxide and with at least about 90% of stoichiometric of neopentylene sulfate for a period of time sufficient to form an alkali metal sulfate intermediate, and hydrolyzing said intermediate to produce the corresponding hydroxyneopentyl ether and wherein said admixing is carried out in the presence of up to about 200 percent, based on the weight of the starting materials of a diluent which is a solvent for the neopentylene sulfate, a medium for the reaction and is non-reactive with respect to the starting materials, said intermediate and the ether formed, and at a temperature of from about 50° C. to below the decomposition temperature of the reactants and the ether formed, and wherein said intermediate is hydrolyzed by an aqueous solution of a mineral acid.

5. Process for the preparation of hydroxyneopentyl ethers having the formula:

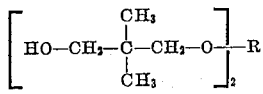

wherein R is as subsequently defined, which comprises admixing an aromatic dihydroxy compound having the formula:

$$R(OH)_2$$

wherein R is a divalent radical selected from the group consisting of arylene, bis-(phenylene)alkane, biphenylene, bis-(phenylene)sulfone, bis-(phenylene)ketone, and diphenylene ether radicals with at least about 90% of stoichiometric of an alkali metal hydroxide, and with at least about 90% of stoichiometric of neopentylene sulfate for a period of time sufficient to form an alkali metal sulfate intermediate, and hydrolyzing said intermediate to produce the corresponding hydroxyneopentyl ether and wherein said admixing is carried out in the presence of up to about 200 percent, based on the weight of the starting materials of a diluent which is a solvent for the neopentylene sulfate, a medium for the reaction and is non-reactive with respect to the starting materials, said intermediate and the ether formed, and at a temperature of from about 50° C. to below the decomposition temperature of the reactants and the ether formed, and wherein said intermediate is hydrolyzed by an aqueous solution of a mineral acid.

6. Process for the preparation of hydroxyneopentyl ethers having the formula:

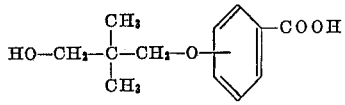

which comprises admixing a hydroxy benzoic acid having the formula:

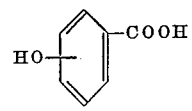

with at least about 90% of stoichiometric of an alkali metal hydroxide, and at least about 90% of stoichiometric of neopentylene sulfate for a period of time sufficient to form an alkali metal sulfate intermediate, and hydrolyzing said intermediate to produce the corresponding hydroxyneopentyl ether and wherein said admixing is carried out in the presence of up to about 200 percent, based on the weight of the starting materials of a diluent which is a solvent for the neopentylene sulfate, a medium for the reaction and is non-reactive with respect to the starting materials, said intermediate and the ether formed, and at a temperature of from about 50° C. to below the decomposition temperature of the reactants and the ether formed, and wherein said intermediate is hydrolyzed by an aqueous solution of a mineral acid.

7. Process for the preparation of hydroxyneopentyl ethers having the formula:

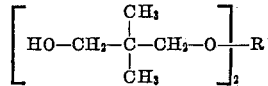

wherein R is as subsequently defined, which comprises admixing in contact with a water-1,4-dioxane mixture and at a temperature of from about 80° C. to about 130° C. an aromatic dihydroxy compound having the formula:

$$R(OH)_2$$

wherein R is a divalent radical selected from the group consisting of arylene, bis-(phenylene)alkane, biphenylene, bis-(phenylene)sulfone, bis-(phenylene)ketone, and diphenylene ether radicals with about a stoichiometric amount of an alkali metal hydroxide, and with about 5% in excess of stoichiometric of neopentylene sulfate for a period of time sufficient to form an alkali metal sulfate intermediate, and hydrolyzing said intermediate to produce the corresponding hydroxyneopentyl ether and wherein said intermediate is hydrolyzed by an aqueous solution of a mineral acid.

8. Process for the preparation of hydroxyneopentyl ethers having the formula:

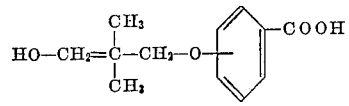

which comprises admixing in contact with a water-1,4-dioxane mixture and at a temperature of from about 80° C. to about 130° C. a hydroxy benzoic acid having the formula:

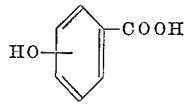

with about a stoichiometric amount of an alkali metal hydroxide, and with about 5% in excess of stoichiometric of neopentylene sulfate for a period of time sufficient to form an alkali metal sulfate intermediate, and hydrolyzing said intermediate to producing the corresponding hydroxyneopentyl ether and wherein said intermediate is hydrolyzed by an aqueous solution of a mineral acid.

9. Process for preparing hydroxyneopentyl ethers which comprises admixing the alkali metal salt of an aromatic hydroxy compound, said aromatic hydroxy compound selected from the group consisting of compounds having the formula:

wherein R is a divalent radical selected from the group consisting of arylene, bis-(phenylene)alkane, biphenylene, bis-(phenylene)sulfone, bis-(phenylene)ketone, and diphenylene ether radicals, and compounds having the formula:

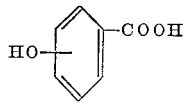

with at least about 90% of stoichiometric of neopentylene sulfate for a period of time sufficient to form the corresponding metal sulfate intermediate and hydrolyzing said intermediate to produce the corresponding hydroxyneopentyl ether and wherein said admixing is carried out in the presence of up to about 200 percent, based on the weight of the starting materials of a diluent which is a solvent for the neopentylene sulfate, a medium for the reaction and is non-reactive with respect to the starting materials, said intermediate and the ether formed, and at a temperature of from about 50° C. to below the decomposition temperature of the reactants and the ether formed, and wherein said intermediate is hydrolyzed by an aqueous solution of a mineral acid.

References Cited
UNITED STATES PATENTS

| | | | |
|---|---|---|---|
| 2,140,824 | 2/1937 | Vernon | 260—613 |
| 2,331,265 | 10/1943 | Coleman et al. | 260—613 |
| 2,675,411 | 4/1954 | Caldwell | 260—591 |
| 2,696,498 | 12/1954 | Hoch et al. | 260—521 |
| 2,708,200 | 5/1955 | Pietsch et al. | 260—327 |
| 2,708,675 | 5/1955 | Slagh | 260—458 |
| 2,714,605 | 8/1955 | Jones | 260—458 |
| 2,789,965 | 4/1957 | Reynolds et al. | 260—47 |
| 2,852,540 | 9/1958 | Gundel et al. | 260—458 |
| 2,891,989 | 6/1959 | Petras | 260—613 X |
| 2,902,518 | 9/1959 | Hurdis et al. | 260—613 |
| 2,987,555 | 6/1961 | Davis | 260—613 |
| 3,013,061 | 12/1961 | Richter | 260—521 X |
| 3,055,913 | 9/1962 | Moore et al. | 260—327 |
| 3,106,546 | 10/1963 | Laakso et al. | 260—47 |

LORRAINE A. WEINBERGER, *Primary Examiner.*

WILLIAM H. SHORT, *Examiner.*

V. A. MORGENSTERN, S. WILLIAMS,
*Assistant Examiners.*